United States Patent
Dinan et al.

(10) Patent No.: US 8,060,054 B1
(45) Date of Patent: Nov. 15, 2011

(54) METHOD AND SYSTEM FOR REACTIVE POWER-SAVING

(75) Inventors: Esmail Dinan, Herndon, VA (US);
Howard Anderson, Ashburn, VA (US);
Hemanth Pawar, Herndon, VA (US);
Daniel Vivanco, Herndon, VA (US);
Vijay Rudraraju, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 598 days.

(21) Appl. No.: 12/270,093

(22) Filed: Nov. 13, 2008

(51) Int. Cl.
*H04B 1/16* (2006.01)

(52) U.S. Cl. ...................................... 455/343.4; 455/574

(58) Field of Classification Search .......................... None
See application file for complete search history.

(56) References Cited

U.S. PATENT DOCUMENTS

| | | | |
|---|---|---|---|
| 7,796,699 B2 * | 9/2010 | Jain et al. | 375/260 |
| 2005/0288022 A1 * | 12/2005 | Ryu et al. | 455/439 |
| 2007/0082715 A1 * | 4/2007 | Rofougaran et al. | 455/574 |
| 2008/0020808 A1 * | 1/2008 | Wang et al. | 455/574 |
| 2008/0069021 A1 * | 3/2008 | Chhabra | 370/311 |
| 2008/0165024 A1 * | 7/2008 | Gretton et al. | 340/825.22 |

* cited by examiner

*Primary Examiner* — Cassandra Cox

(57) ABSTRACT

Disclosed herein is a method and system for power management in a subscriber station. The method involves (a) during a communication session between a subscriber station and an access network, determining a packet inter-arrival time for data received from the access network; (b) determining whether the packet inter-arrival time indicates that the communication session is in a high-activity state or, in the alternative, indicates that the communication session is in a low-activity state; (c) if the packet inter-arrival time indicates that the communication session is in the low-activity state, then selecting a first power-saving mode for use by the subscriber station; and (d) if the packet inter-arrival time indicates that the communication session is in the high.

23 Claims, 8 Drawing Sheets

METHOD AND SYSTEM FOR REACTIVE POWER-SAVING

BACKGROUND

When communicating under an air-interface protocol, such as WiMAX, a subscriber station may be configured to switch to and operate in a power-saving mode during periods of lower activity and/or inactivity. When operating in a power-saving mode, the subscriber station may disable certain functions, such as its systems for reception and/or scanning, in order to save power. By operating in sleep mode, the subscriber station may conserve power without disconnecting from the access network, thus eliminating the need to reconnect with the access network when the subscriber station exits the power-saving mode.

The WiMAX protocol specifies three different types of power-saving modes, which are collectively referred to as power-saving classes (PSCs), and are individually referred to as PSC I, PSC II, and PSC III. Generally, a subscriber station operating according to one of the WiMAX PSCs alternates between "sleeping," where functionality is reduced to conserve power, and "listening," where reception is powered on to determine if the serving base station is attempting to send data to the subscriber station. Each interval for which the subscriber station sleeps is referred to as a "sleep interval," while each interval for which the subscriber station listens referred to as a "listening interval."

According to 802.16e, when traffic arrives for a subscriber station that is in sleep mode, the subscriber station will receive a mobile-traffic-indication (MOB-TRF-IND) message from its serving base station, which indicates that traffic intended for the subscriber station has arrived at the base station. The MOB-TRF-IND message is typically sent such that the subscriber station receives the message during the listening interval immediately following the sleep interval where data intended for the subscriber station arrived. When operating according to PSC I, a subscriber station increases the size of the sleep interval after each successive listening interval during which no incoming traffic arrives for the subscriber station. PSC II is similar to PSC I, except that the size of the sleep interval remains constant, and does not increase.

OVERVIEW

When using WiMAX power-saving class (PSC) I or PSC II to conserve power, a client device or subscriber station may experience delay in downlink traffic when switching from sleep mode to wake mode. Specifically, delay occurs because the subscriber station does not know that packets have arrived during a sleep interval until after the sleep interval ends and, in the following listening interval, it receives a mobile traffic indicator (MOB-TRF-IND) message from the base station. The greater the duration of the sleep interval, the larger the expected delay when exiting sleep mode. Since the duration of the sleep interval iteratively increases under PSC I, the potential for delay is typically greater when a subscriber station operates according to PSC I than when the subscriber station operates according to PSC II.

According to an exemplary embodiment, a subscriber station may be configured for reactive power-saving, and as such, may be configured to switch between two or more power-saving modes, during a given communication session. In an exemplary embodiment, a subscriber station selects between PSC I and PSC II based on the current packet inter-arrival time (i.e., the time between packets arrival of consecutive packets at the subscriber station) or the current data rate at which it is receiving data from the base station. Generally, if packets are arriving on a frequent basis and the packet inter-arrival time is shorter, PSC II is selected to help reduce downlink delay and power consumption. If, on the other hand, packets are arriving less frequently or are delayed (e.g., during a voice silence period, application response time or reading time), then the subscriber station selects PSC I. Thus, if the packet inter-arrival time and/or other characteristics of a communication session change during the session, the subscriber station may switch between PSCs during the session.

Further, the subscriber station may initially determine whether or not the type of communication in which it is engaged is appropriate for reactive power-saving (e.g., choosing between PSC I and II). Reactive power-saving may then be used by the subscriber station if appropriate. Preferably, reactive power-saving is selected as the power-saving technique when the subscriber station is engaged in communications that typically have a variable data rate or variable packet inter-arrival times.

In one aspect, a method for power management in a subscriber station is disclosed. The method involves (a) during a communication session between the subscriber station and an access network, determining a packet inter-arrival time for data received from the access network; (b) determining whether the packet inter-arrival time indicates that the communication session is in a high-activity state or, in the alternative, indicates that the communication session is in a low-activity state; (c) if the packet inter-arrival time indicates that the communication session is in a low-activity state, then selecting a first power-saving mode for use by the subscriber station; and (d) if the packet inter-arrival time indicates that the communication session is in a high-activity state, then selecting a second power-saving mode for use by the subscriber station.

In another aspect, an apparatus configured to engage in communications via an access network is disclosed. The apparatus may also be configured to selectively operate in at least a first power-saving mode and a second power-saving mode. The apparatus may comprise (i) a power source, wherein operating in the first or second power-saving mode reduces demand for power from the power source; (ii) a processor; and (iii) program code stored in data storage and executable by the processor to: (a) during a communication session via an access network, determine a packet inter-arrival time for data received from the access network; (b) determine whether the packet inter-arrival time indicates that the communication session is in a high-activity state or, in the alternative, indicates that the communication session is in a low-activity state; (c) if the packet inter-arrival time indicates that the communication session is in the low-activity state, then selectively operate in the first power-saving mode; and (d) if the packet inter-arrival time indicates that the communication session is in the high-activity state, then selectively operate in the second power-saving mode.

In another aspect, a method for power management in a subscriber station is disclosed. The method comprises (a) making a determination as to whether or not a communication session in which the subscriber station is engaged is a variable-activity communication session; and (b) if the determination is that the communication session is a variable-activity communication session, then using a reactive power-saving method to conserve power during the communication session, wherein the reactive power-saving method comprises the subscriber station, during the communication session, selectively switching between two or more power-saving modes based on packet inter-arrival time of the communication session. Further, if the determination is that the communication session is not a variable-activity communication session, then using a standard power-saving method or refraining from using a power-saving method during the communication session, wherein the standard power-saving method provides a single power saving mode for the subscriber station.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION

A method and apparatus for power saving are described herein with reference to an exemplary embodiment, where power saving is implemented by a subscriber station configured to communicate under the Worldwide Interoperability for Microwave Access (WiMAX) protocol. WiMAX is an Institute of Electrical and Electronics Engineers (IEEE) standard, designated 802.16, with the 802.16e being the current version of the standard (the terms "IEEE 802.16," "802.16e," and "WiMAX" may be used interchangeably herein). WiMAX provides a robust mechanism for wireless communication between base stations and subscriber stations. In particular, WiMAX is designed to provide fixed, portable or non-line-of-sight service with a potential range of 6 miles or more, a potential bandwidth on the order of 40 megabits per second, and generally superior quality of service and security. Those skilled in the art will understand that the method and apparatus may be implemented with or involve any other wired or wireless protocol such as IEEE 802.11, CDMA, and/or 1xEV-DO, among others, in addition or in the alternative to WiMAX.

WiMAX chipsets that provide for communication in accordance with the WiMAX protocol may be included as standard or optional equipment not only in traditional wireless communications devices, such as cellular phones and personal digital assistants, but also in devices that, heretofore, were not typically used for access to telephony networks, such as portable music players, entertainment devices such as game players, automobiles, domestic appliances and so on. Herein, the term "subscriber station" should be understood to include any such traditional or non-traditional device. More generally, a subscriber station may be any device configured to communicate according to one or more wired or wireless protocols such as WiMAX, IEEE 802.11, CDMA, and/or 1xEV-DO, among others. Further, it should be understood that a subscriber station does not require a subscription to fall within the scope of the invention.

Figure 1:
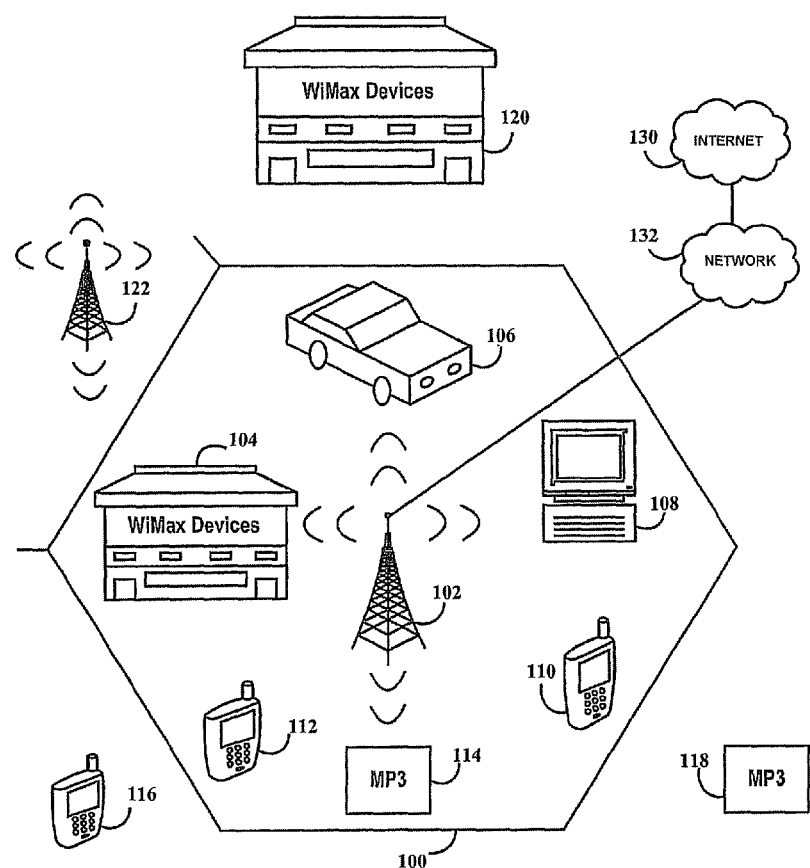
FIG. 1 is a schematic representation of a coverage area where service is available from a WiMAX base station, according to an exemplary embodiment.

FIG. 1 is a schematic representation of a coverage area 100 where service is available from a WiMAX base station 102. Also shown are a plurality of WiMAX subscriber stations that may engage in various types of communications via WiMAX base station 102. The subscriber stations may take the form of, for example, WiMAX devices located in a building or home 104, such computers, appliances or cell phones, WiMAX devices located in an automobile 106, a portable computer 108, a cellular telephone 110, a personal digital assistant 112, an MP3 player 114, another cell phone 116, another MP3 player 118 and/or various other WiMAX devices such as computers, cell phones, game players, etc. In coverage areas adjacent to coverage area 100, other base stations, such as base station 122, may provide service.

Provided with a WiMAX connection via base station 102, a subscriber station may engage in various types of communication. For instance, a base station 102 may provide connectivity to a packet-switched network 130 such as the Internet. Such packet-data connectivity may be provided via a service provider's network 132 or directly. In addition to packet-data connectivity generally, a WiMAX connection may provide particular services such as voice-over-IP (VoIP), among others.

While engaged in a communication session via base station 102, a subscriber station may experience "downtime," where data flow to and from the subscriber station slows or even ceases. In order to conserve power, and at the same time maintain its connection and/or session state, the subscriber station may switch into a power-saving mode during such downtime. In the power-saving mode, the subscriber station may power down or power off certain components and/or may reduce or disable certain functionality, such as reception and transmission.

Advantageously, a subscriber station may also be configured implement a power-saving mode (i.e., go to sleep, switch to sleep mode, etc.) to conserve power during periods of higher activity. For instance, the subscriber station may go to sleep between each packet received during a communication session, waking up only for long enough to receive each packet, and then going back to sleep until it is time to receive the next packet. Other uses of power-saving modes by a subscriber station are also possible.

Under WiMAX, a subscriber station may operate according to one of the three power-saving classes, which are defined by 802.16e. The three WiMAX power-saving classes may be referred to as PSC I-III. According to 802.16e, PSC I is recommended for Best Effort (BE) and Non Real-Time Variable Rate (NRT-VR) activities, while PSC II is recommended for Unsolicited Grant Service (UGS) and Real-Time Variable Rate (RT-VR) traffic. While PSC III is not discussed in detail herein, the details of PSC III are set forth in 802.16e and it is possible that an exemplary power-saving method or system may incorporate PSC III, without departing from the scope of the invention. While operating according to one of the WiMAX PSCs, the subscriber station maintains its connection ID (CID), service flow identifier (SFID), IP address, and its physical-layer connection with the access network, so that its connection persists and/or the access network maintains its session data.

Figure 2A:
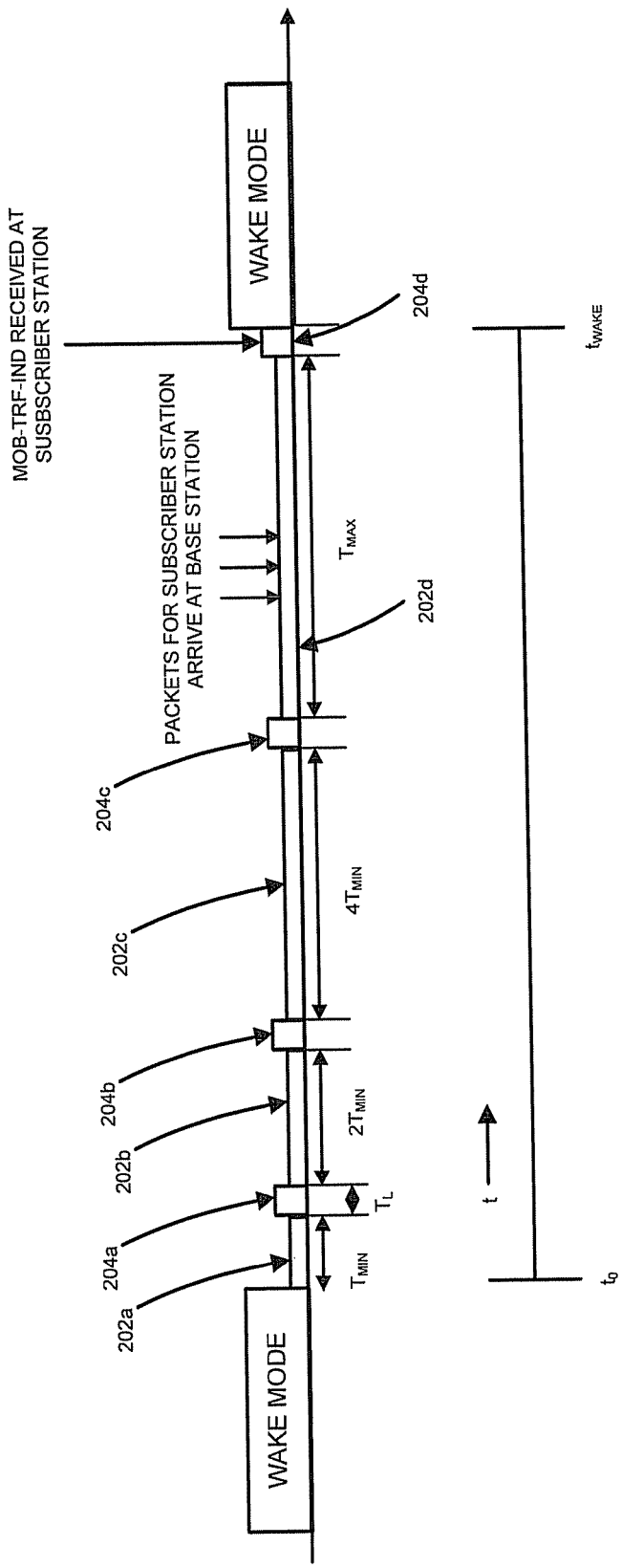
FIG. 2A is a simplified timeline illustrating sleep-mode operation of a subscriber station according to WiMAX power-saving class I, according to an exemplary embodiment.

FIG. 2A is a simplified timeline illustrating sleep mode operation of a subscriber station according to PSC I. When operating according to PSC I, the subscriber station switches back and forth between sleeping during sleep intervals 202a-d, and listening for a signal from the base station during listening intervals 204a-d. According to PSC I, the subscriber station increases the length of each successive sleep interval 202a-d until it receives a mobile-traffic-indication (MOB-TRF-IND) message, at which point the subscriber station wakes up to again receive data.

It should be understood that the term "sleep mode" may be used to refer to all operations performed under a given PSC. Thus, functionality in sleep mode may include both sleeping, such as in sleep intervals 202a-d, and listening, such as in listening intervals 204a-d. As such, the subscriber station may be said to be operating in sleep mode from time $t_0$ until time $t_{WAKE}$. Before the subscriber station goes to sleep at time $t_0$, and after the subscriber station wakes up at time $t_{WAKE}$, the subscriber station may operate in a "standard mode" (herein, referred to interchangeably as a "wake mode"). Typically, the subscriber station returns to its fully operative state when it switches from sleep mode to standard mode. However, the term "standard mode" (or "wake mode") may refer more generally to any mode of operation that is not a sleep or power-saving mode.

To implement PSC I, three parameters may be pre-negotiated between the base station and the subscriber station: (1) the initial sleep interval ($T_{MIN}$); (2) the final or maximum sleep interval ($T_{MAX}$); and (3) the listening interval ($T_L$). $T_{MIN}$ defines the length of the initial sleep interval (i.e., the period of time between switching to sleep mode and the start of the first listening interval). Further, under PSC I, the length of a given sleep interval $S_n$ for n=(1, 2, 3, . . . ), such as sleep intervals 202a-d, is calculated as:

$$S_n = \mathrm{MIN}((2^{(n-1)})*T_{MIN}, T_{MAX})$$

Thus, during a given sleep interval $S_n$, the subscriber station will sleep for a period of time equal to $T_{MIN}$ multiplied by a coefficient that increases by a factor of two with each successive sleep interval. Thus, the length of each successive sleep interval increases until $S_n$ exceeds the final sleep interval $T_{MAX}$. When this occurs, the duration of the sleep interval will be set to $T_{MAX}$, and remain constant at $T_{MAX}$ for any subsequent sleep intervals, until data is received for the subscriber station.

According to both PSC I and II, the duration of each listening interval is the same, and is thus defined by the constant $T_L$. Thus, after each sleep interval, the subscriber station powers on its receiver for the listening interval $T_L$ in order to receive a signal from the base station indicating that an incoming communication (e.g., data or more specifically, packetized data) has arrived for the subscriber station. In WiMAX, $T_L$ is typically set to be equal to the period of time required to transmit one medium access control (MAC) frame. However, it should be understood that $T_L$ may vary according to engineering design choice.

Referring to the specific example illustrated in FIG. 2A, the subscriber station switches from standard mode to sleep mode at time $t_0$. During the first sleep interval 202a, the subscriber station sleeps for a period of time equal to $T_{MIN}$. The subscriber station then powers on its receiver during the first listening interval 204a to listen for a signal from the base station. The duration of the listening interval is constant—that is, in the first listening interval 204a and in subsequent listening intervals 204b-d, the subscriber station keeps its receiver powered on for a period of time equal to $T_L$. Since no data is received during sleep interval 202a, the base station may either refrain from sending a message or send a message indicating that no data was received for the subscriber station. In either case, the subscriber station goes back to sleep for the second sleep interval 202b. Setting $T_{MAX}$ to equal four times $T_{MIN}$, the duration of the second sleep interval 202b may be calculated as:

$$S_2 = \mathrm{MIN}(2^{(2-1)}*T_{MIN}, 4T_{MIN}) = 2T_{MIN}$$

Using the same technique, the subscriber station may determine the duration of the third sleep interval 202c to be $S_3 = 4T_{MIN}$. For the fourth sleep interval 202d, however, the subscriber station determines that the duration $2^{(4-1)}*T_{MIN} = 8T_{MIN}$ exceeds $T_{MAX}$. Thus, the subscriber station determines the duration of the fourth sleep interval to be $T_{MAX} = 4T_{MIN}$.

During the fourth sleep interval 202d, data 208, which is intended for the subscriber station, is received at the base station. Accordingly, the subscriber station receives a signal from the base station, in this case a MOB-TRF-IND message, which indicates that the base station has received data for the subscriber station. In response, the subscriber station exits sleep mode so that it can receive the data from the base station. It should be understood, however, that if no data were received during the fourth sleep interval, the subscriber station would continue to switch between sleep mode and listening mode, with the duration of each successive sleep interval equal to $T_{MAX}$.

It should also be understood that, because the parameters defined by PSC I are pre-negotiated between the subscriber station and the base station, the base station generally is aware when the subscriber station is sleeping and when the subscriber station is listening. As such, the base station may transmit a MOB-TRF-IND message with timing such that the message arrives at the subscriber station during a listening interval. Further, when the base station receives data at a time during which it believes the subscriber station is sleeping, the base station may buffer the data for transmission after it sends the MOB-TRF-IND message and the subscriber station wakes up. Alternatively, the base station may attempt to send data when the data is received, and then buffer the data in the event that the subscriber station is sleeping and attempts to send the data to the subscriber station are unsuccessful (e.g., the data bounces back to the base station). In such an embodiment, the base station may not actively monitor or determine if the subscriber station is sleeping, as an unsuccessful attempt to send data may serve as the indication that the subscriber station is sleeping, and accordingly, that incoming data for the subscriber station should be buffered.

Figure 2B:
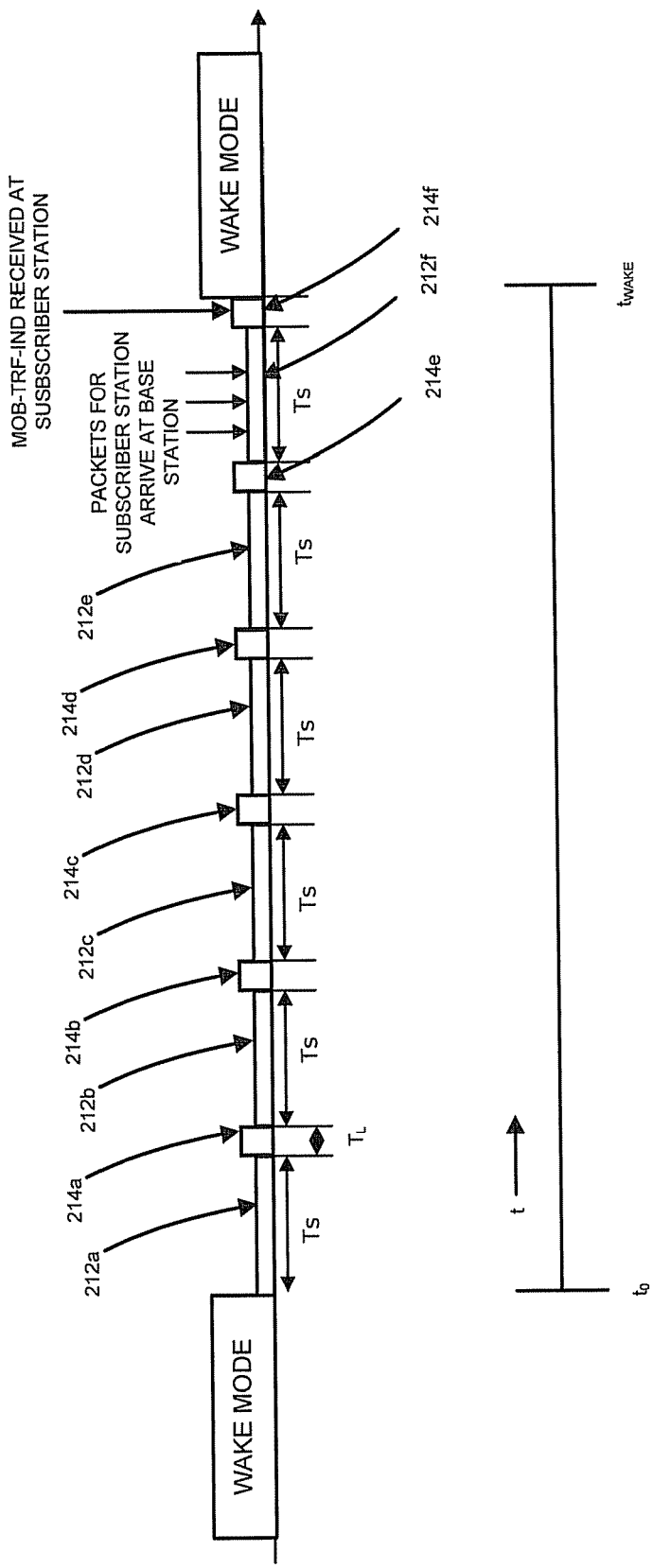
FIG. 2B is a simplified timeline illustrating sleep-mode operation of a subscriber station according to WiMAX power-saving class II, according to an exemplary embodiment.

FIG. 2B is a simplified timeline illustrating sleep-mode operation of a subscriber station according to PSC II. As shown, the subscriber station alternates between sleep intervals 212a-f (each of the same duration), and listening intervals 214a-f (each of the same duration), until it receives a signal from the base station indicating that packets arrived during sleep interval 212f. PSC II is similar to PSC I in that the subscriber station alternates between sleeping and listening for a signal from the base station, and in that the listening interval is constant. However, in PSC II, the duration of the sleep interval is also kept constant. Thus, to implement PSC II, two parameters may be pre-negotiated between the base station and the subscriber station: (1) the sleep interval ($T_S$) and (2) the listening interval ($T_L$).

Figure 3:
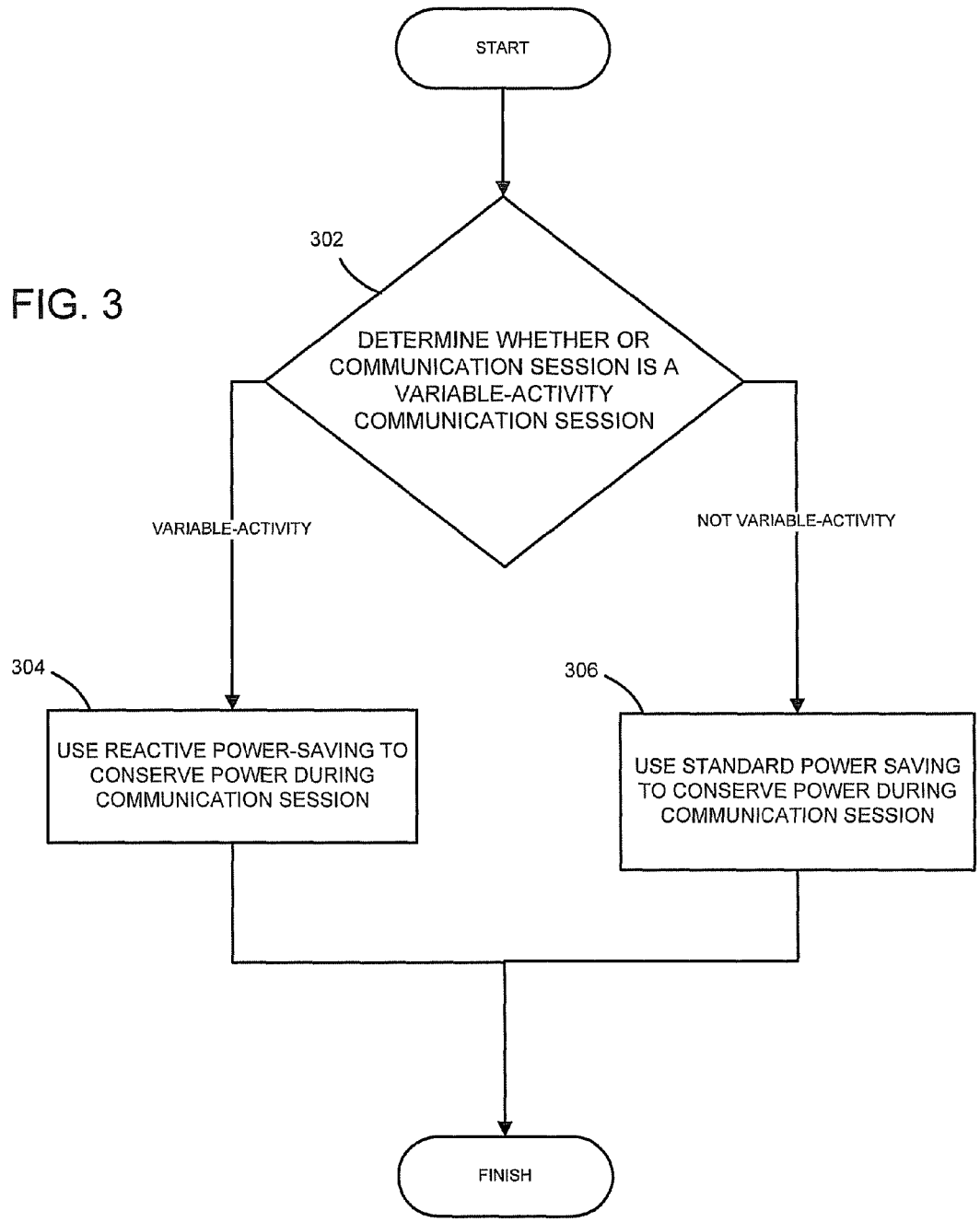
FIG. 3 is a flow chart illustrating a method for power management in a subscriber station according to an exemplary embodiment.

FIG. 3 is a flow chart illustrating a method for power management in a subscriber station according to an exemplary embodiment. The method is carried out by way of example, with reference to a subscriber station carrying out the method. It should be understood, however, that the method or portions thereof, may also be carried out by an access network, alone or in combination with a subscriber station.

The exemplary method involves determining whether or not a communication session in which the subscriber station is engaged is a variable-activity communication session, as shown by block 302. If it is determined that the communication session is a variable-activity communication session, then a reactive power-saving method is used to conserve power during the communication session, as shown by block 304. If, on the other hand, it is determined that the communication session is not a variable-activity communication session then a standard power-saving method is used to conserve power during the communication session, as shown by block 306. For instance, in an exemplary embodiment, PSC II may be used for all non-variable-activity communications. Other examples are also possible.

The subscriber station may determine that the communication session in which it is engaged is a variable-activity communication session based on the communication session being of a type that is classified as a variable-activity communication session, and/or based on a determination that the subscriber station is experiencing variable activity during the communication session. In an exemplary embodiment, the subscriber station may determine that the communication session is of a type that typically has variable packet inter-arrival times, and/or that in the communication session, the subscriber station is experiencing variable packet inter-arrival times. Alternatively or additionally, the subscriber station may measure the packet inter-arrival times periodically during a communication session. The subscriber station may then compare the packet inter-arrival times measured at different points in the communication to determine if the packet inter-arrival time is variable.

It should be understood that the variability of packet inter-arrival time (i.e., the time between arrivals of consecutive packets) in a communication session, is related to the variability of the packet rate (i.e., the rate at which packets arrive at the subscriber station) in a communication session. For example, if the packet rate is measured over two packets, the packet rate is simply the frequency domain representation of the packet inter-arrival time (i.e., the time between the arrivals of the two packets). Further, if the packet rate is measured over a period of time in which multiple packets are received, the packet rate is the frequency domain representation of the average packet inter-arrival time during the period. Accordingly, the subscriber station may also determine that the communication session in which it is engaged is a variable-activity communication session based on the typical packet-rate variability of the type of communication in which it is engaged, and/or the measured variability of the packet-rate or date rate in the communication session.

More generally, exemplary embodiments may be described by way of example, with reference to the subscriber station determining a packet inter-arrival time. However, one skilled in the art will understand that because of the relationship between the packet rate and packet inter-arrival times, a determination of the packet inter-arrival time may take the form of a packet-rate determination, without departing from the scope of the invention.

Various types of communication sessions may be classified as having variable activity. For example, certain types of communication sessions allow for traffic patterns such that the packet inter-arrival time at one point during the session, may be substantially different from the packet inter-arrival time at another point during the communication session. Therefore, a communication session of such a type may be classified as a variable-activity communication session. As a specific example, communications involving Internet traffic are typically characterized as having variable packet inter-arrival time. When data is being downloaded or streamed via the Internet and packets are arriving frequently, the data rate (or packet rate) is higher, resulting in packet inter-arrival times that are smaller—in the range of milliseconds in an exemplary embodiment. However, an Internet session may also involve less active periods, where the session nonetheless persists, but packets arrive less frequently or possibly not at all. In such low-activity periods, inter-arrival times are larger—in the range of seconds in an exemplary embodiment. Due to the potential for such variable data rates during a single session, communication sessions conducted via the Internet, or more generally, communication sessions that incorporate IP traffic, may be classified as variable-activity communication sessions.

As another specific example, real-time traffic may have a higher data rate during a period when data is being streamed, and at other times may have a lower data rate or may stop altogether, such as when streaming video is paused. Thus, real-time sessions may also classified as variable-activity communication sessions. Other types of communications that may be classified as variable-activity communication sessions include, for example, communications in such applications as voice-over-IP (VoIP), interactive gaming, interactive audio and/or video, streaming media, real-time polling service (rtPS), and enhanced real-time polling service (ertPS).

Further, the determination of whether or not a communication session is of a type that is classified as a variable-activity communication session may involve the subscriber station accessing, or requesting that a base station access, a database that identifies which types of communication sessions are classified as variable-activity communication sessions. For example, a base station or other access network entity may maintain a database cataloguing which types of communication sessions are classified as variable-activity communication sessions. As such, the subscriber station may query the base station on an as-needed basis to determine if a given communication is a variable-activity communication session. Alternatively or additionally, a subscriber station may maintain a database indicating which types of communication sessions are classified as variable-activity communication sessions. This database may be pre-populated, or may be populated as the subscriber station acquires information on various types of communications from base stations. In either scenario, the subscriber station may update the database over time as the subscriber station learns the characteristics (e.g., typical packet inter-arrival times and/or packet rates) of various types of communications through its own communication sessions.

The reactive power-saving method, used when the subscriber station determines its communication session is a variable-activity communication session, may involve the subscriber station selectively switching between two or more power-saving modes based on packet inter-arrival time of the communication session. For example, during a communication session, the subscriber station may determine the current packet inter-arrival time of the communication session, and then use the current packet inter-arrival time to select one of the two or more power-saving modes. In an exemplary embodiment, a subscriber station uses PSC II during high-activity periods, and uses PSC I during low-activity periods. When the subscriber station is in a high-activity or low-activity period, the subscriber station, and the communication in which the subscriber station is engaged, may be said to be in a high-activity state or a low-activity state, respectively. Therefore, if the current packet inter-arrival time is greater than a threshold packet inter-arrival time, the subscriber station may determine that it is in a high-activity state and responsively use PSC II to conserve power. If, on the other hand, the current packet inter-arrival time is less than the threshold packet inter-arrival time, the subscriber station may determine that it is in a low-activity state and responsively use PSC I. Other selections of other power-saving modes may be made according to different activity thresholds, without departing from the invention.

Figure 4:
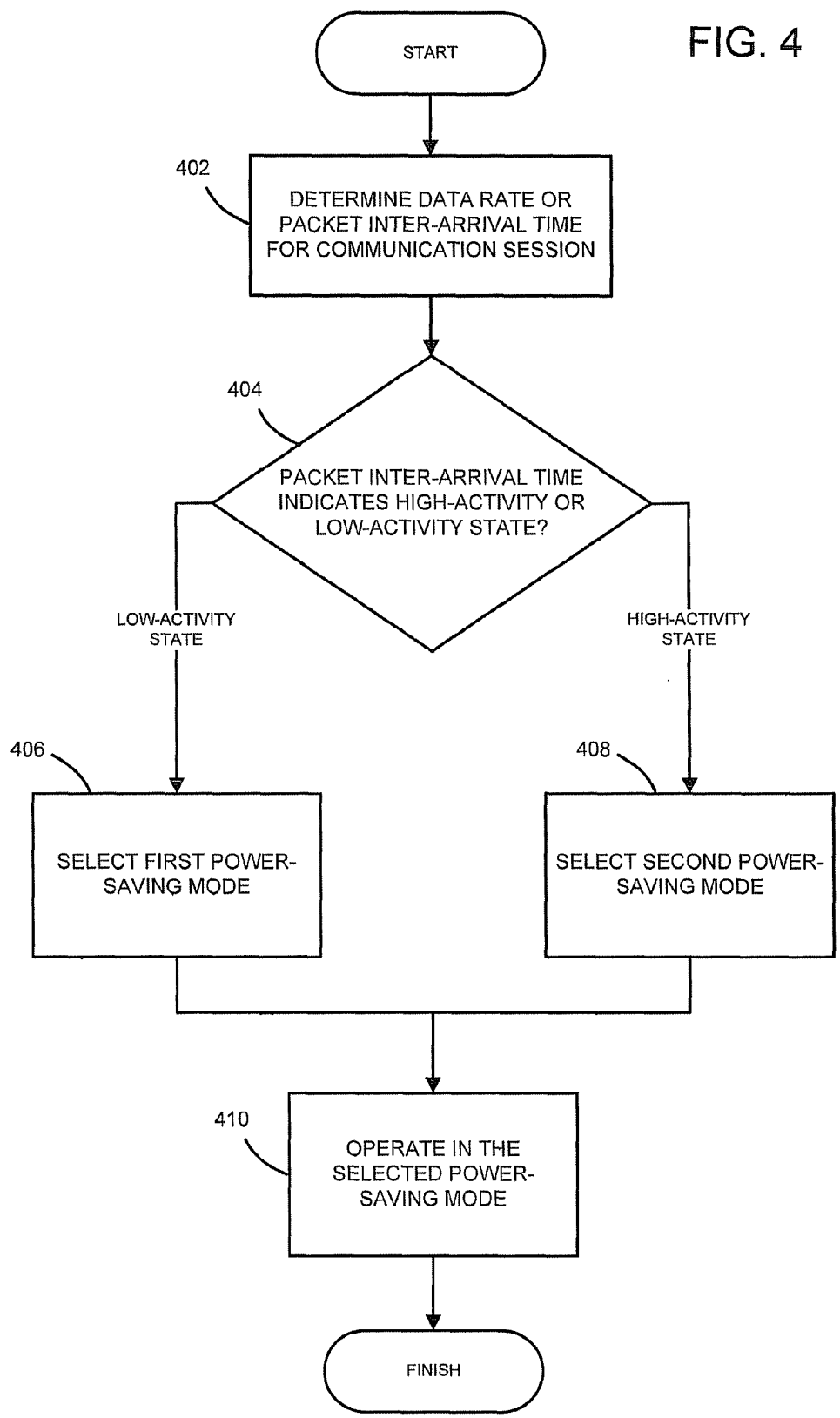
FIG. 4 is another flow chart illustrating a method for power management in a subscriber station according to an exemplary embodiment.

FIG. 4 is another flow chart illustrating a method for power management in a subscriber station according to an exemplary embodiment. The method is described by way of example, with reference to a subscriber station carrying out the method. However, it should be understood that other entities (such as a base station and/or other access network entities), may carry out the method or portions of the method, without departing from the scope of the invention. Further, to facilitate the method, at least two predefined power-saving modes may be defined for the subscriber station.

In an exemplary embodiment, the subscriber station determines, during an ongoing communication session via an access network, the packet inter-arrival time of data that the subscriber station is receiving from the access network, as shown by block 402. The subscriber station may then determine whether the packet inter-arrival time indicates that the communication session is in a high-activity state or, in the alternative, indicates that the communication session is in a low-activity state, as shown by block 404. If the communication session is in a low-activity state, then the subscriber station selects a first power-saving mode, as shown by block 406. If, on the other hand, the communication session is in a high-activity state, then the subscriber station selects a second power-saving mode, as shown by block 408. After selecting the first or second power-saving mode, the subscriber station may operate in the selected power-saving mode, as shown by block 410. In an exemplary embodiment, the first and second power-saving mode are PSC I and II, respectively.

In practice, the determination of a packet inter-arrival time may simply involve the subscriber station determining that the packet inter-arrival time is going to exceed a threshold period of time, rather than a determination of the actual time between receiving successive packets. For example, the subscriber station may use a timer to monitor the elapsed time since arrival of the last packet in a communication session. Then, to determine the state of the session (i.e., whether the session is in a high or low-activity state), the subscriber station may compare the elapsed time to a threshold period of time.

The above technique for determining a packet inter-arrival time may at times be preferable to determining the actual time between successive packets, as it can be implemented by a simple timer that restarts upon the reception of each packet, and does not require reception of two or more packets. For example, the subscriber station may start a timer at or near the arrival of each packet, and may reset and start the timer upon the arrival of each successive packet. Therefore, when the communication session is in a high-activity state, the session remains in a high-activity state so long as the elapsed time since receiving the last packet is less than the threshold period of time. Once the elapsed time since receiving the last packet exceeds the threshold period of time, however, the subscriber station may responsively determine the session is in a low-activity state. The session then remains in a low-activity state until the packet inter-arrival time is less than the threshold period. It should be understood that determining the packet inter-arrival time may alternatively or additionally involve measuring the actual period of time between arrivals of two or more successive packets, and comparing this measured inter-arrival time to a threshold period of time. For example, the subscriber station may determine that the packet inter-arrival time is less than the threshold period either by measuring the actual time between packet arrivals, or by detecting that a packet while the elapsed time is less than the threshold period. Other examples are also possible.

Accordingly, the method may involve monitoring or tracking the time elapsed since arrival of the last packet in a session, and comparing the elapsed time to a threshold packet inter-arrival time. The subscriber station may then switch to PSC I when the period of time since the last received packet exceeds threshold packet inter-arrival time. Further, subscriber station may continue operating according to PSC I until it detects at least one packet inter-arrival time that is less than the threshold packet inter-arrival time (in this case, the packet inter-arrival time may be the actual time between two packets). When the subscriber station detects one or more packet inter-arrival time that is less than the threshold (indicating a high-activity state), the subscriber station switches to PSC II. Further, the subscriber station continues to operate under PSC II until it detects that the elapsed period since the last received packet exceeds the threshold, or until it wakes up.

The threshold packet inter-arrival time (or threshold data rate) may be set such that a VoIP traffic silence period, an interactive-gaming waiting period, an interactive video streaming pause period, and/or a web-session reading period, among others, are identified as low-activity periods. For instance, in a realtime streaming video session, packets typically arrive once every 20 milliseconds. If, for example, the pause period for streaming video is 200 ms, the threshold period after which the subscriber station switches to PSC I, may be set at 200 ms. Other examples are also possible.

In an alternative embodiment (or as an additional feature), the access network may maintain a database for tracking packet inter-arrival times and/or data rates for various types of communications (e.g., VoIP, real-time video, etc.). The historical packet inter-arrival time information stored in the database may then be used to predict when high-activity and/or low-activity periods will occur, and proactively determine when a communication session is entering a high-activity or a low-activity period.

In a further aspect, the method may involve the subscriber station calculating PSC parameter values (e.g., $T_{MIN}$, $T_{MAX}$, and/or $T_L$ for PSC I, and $T_S$ and/or $T_L$ for PSC II) to be used for PSC I or PSC II. These PSC parameters may be selected based upon the type of communication, and in particular, the packet-delay tolerance and/or the quality of service (QoS) requirements of a communication. More specifically, the subscriber station may consider current data rate and/or packet inter-arrival time (current and/or previous) in calculating the sleep interval (for PSC II), or the minimum and maximum sleep interval (for PSC I). The subscriber station may also use a maximum_delay parameter and/or a maximum jitter parameter, which define the maximum tolerable delay and the maximum tolerable jitter, respectively, for a given type of communication. To determine the maximum tolerable delay and the maximum tolerable jitter (and possibly other parameters), the subscriber station may maintain a database that provides the packet-delay tolerance and/or the quality of service (QoS)

requirements for various types of communications, may query such a database maintained elsewhere, or send a request to a base station to provide values for these parameters for a given type of communication.

As a specific example, when a subscriber station selects PSC II, the subscriber station may calculate the sleep interval $T_S$ as:

$$T_S = \mathrm{MIN}(T_{PACKET\_INTERARRIVAL} - (T_{WAKE} + T_L), \text{maximum\_delay})$$

In this formula, $T_{PACKET\_INTERARRIVAL}$ is the packet inter-arrival time and $T_{WAKE}$ is the period of time for which the subscriber station remains awake before going back to sleep. In some embodiments, $T_{WAKE}$ may be indefinite, and accordingly may be excluded from the above formula.

Similarly, when the subscriber station selects PSC I, the subscriber station may determine values for $T_{MIN}$ and/or $T_{MAX}$. For example, the initial sleep interval $T_{MIN}$ may be set equal to the minimum of (i) the current or most-recent packet inter-arrival time and (ii) the maximum tolerable delay for the communication in which the subscriber station is engaged. Thus, the initial sleep interval may be calculated as:

$$T_{MIN} = \mathrm{MIN}(T_{PACKET\_INTERARRIVAL} - (T_{WAKE} + T_L), \text{maximum\_delay})$$

In this formula, $T_{PACKET\_INTERARRIVAL}$ is the packet inter-arrival time and $T_{WAKE}$ is the period of time for which the subscriber station remains awake before going back to sleep. In some embodiments, $T_{WAKE}$ may be indefinite, and accordingly may be excluded from the above formula. Further, the final or maximum sleep interval $T_{MAX}$ may be calculated as:

$$T_{MAX} = K_1 * \text{maximum\_delay} + K_2 * \text{maximum jitter}$$

In this calculation, $K_1$ and $K_2$ are optimization parameters, and may be selected as a matter of engineering design choice.

In the case of VoIP communications, the maximum tolerable delay may be 60 milliseconds (ms), the maximum tolerable jitter may be 15 ms, and both K1 and K2 may be set equal to one. In addition, at a given point during the communication session, the packet inter-arrival time may be 20 ms, the listening interval $T_L$ may be 1 ms, and the wake mode may be indefinite, so $T_{WAKE}$ may be omitted. As a result, the subscriber station may calculate the sleep interval $T_S$ for PSC II as:

$$T_S = \mathrm{MIN}(20\ \mathrm{ms} - 1\ \mathrm{ms}, 60\ \mathrm{ms}) = 19\ \mathrm{ms}$$

The subscriber station may calculate $T_S$ when the subscriber station is switching or about to switch to sleep mode under PSC II. Further, the subscriber station may periodically calculate and update $T_S$ while in sleep mode under PSC II.

Similarly, when the above parameters are defined for PSC I, the subscriber station may calculate the minimum sleep interval $T_{MIN}$, and maximum sleep interval $T_{MAX}$, as:

$$T_{MIN} = \mathrm{MIN}(20\ \mathrm{ms} - 1\ \mathrm{ms}, 60\ \mathrm{ms}) = 19\ \mathrm{ms}$$

$$T_{MAX} = 60\ \mathrm{ms} + 15\ \mathrm{ms} = 75\ \mathrm{ms}$$

And as it may do with $T_S$, the subscriber station may calculate $T_{MIN}$ and/or $T_{MAX}$ when the subscriber station is switching or about to switch to sleep mode under PSC I, and/or may periodically calculate and update $T_{MIN}$ and/or $T_{MAX}$ while in sleep mode under PSC I. Whenever the subscriber station determines $T_S$, $T_{MIN}$ or $T_{MAX}$, the subscriber station may report one or more of the determined values to its serving base station.

In a further aspect, a subscriber station and/or base station may determine a multiplier K for use in determining the length $S_n$ of a given sleep interval. Therefore, $S_n$ may generally be calculated as:

$$S_n = \mathrm{MIN}((K^{(n-1)} * T_{MIN}), T_{MAX})$$

Herein, the multiplier is generally set as K=2, and thus $S_n$ is given by the formula $S_n = \mathrm{MIN}((2^{(n-1)} * T_{MIN}), T_{MAX})$. However, other values may be selected for the multiplier K as a matter of engineering design choice.

Figure 5A:
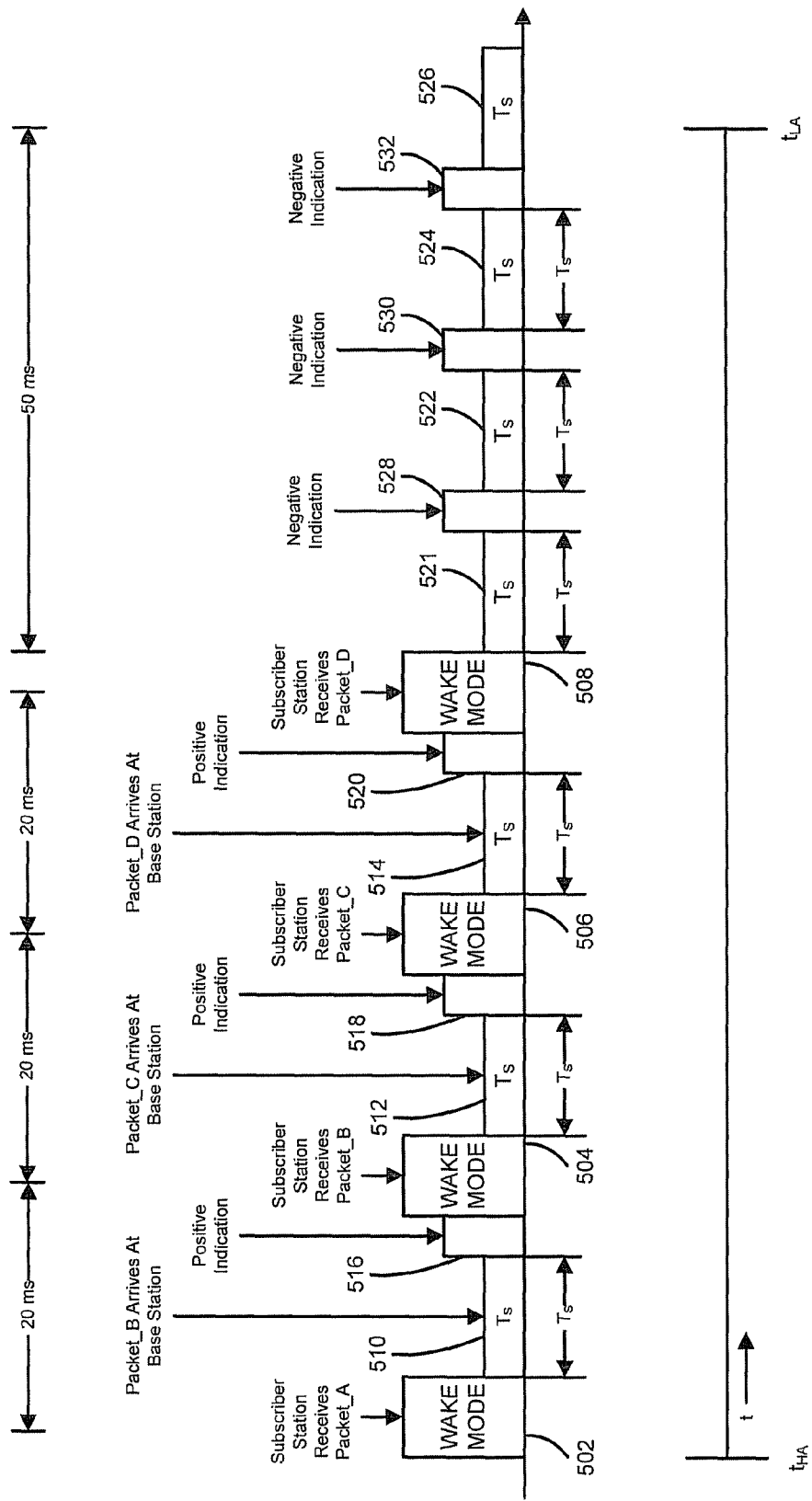
FIG. 5A is a simplified timeline illustrating the application of reactive power saving in voice-over-IP communications, according to an exemplary embodiment.
Figure 5B:
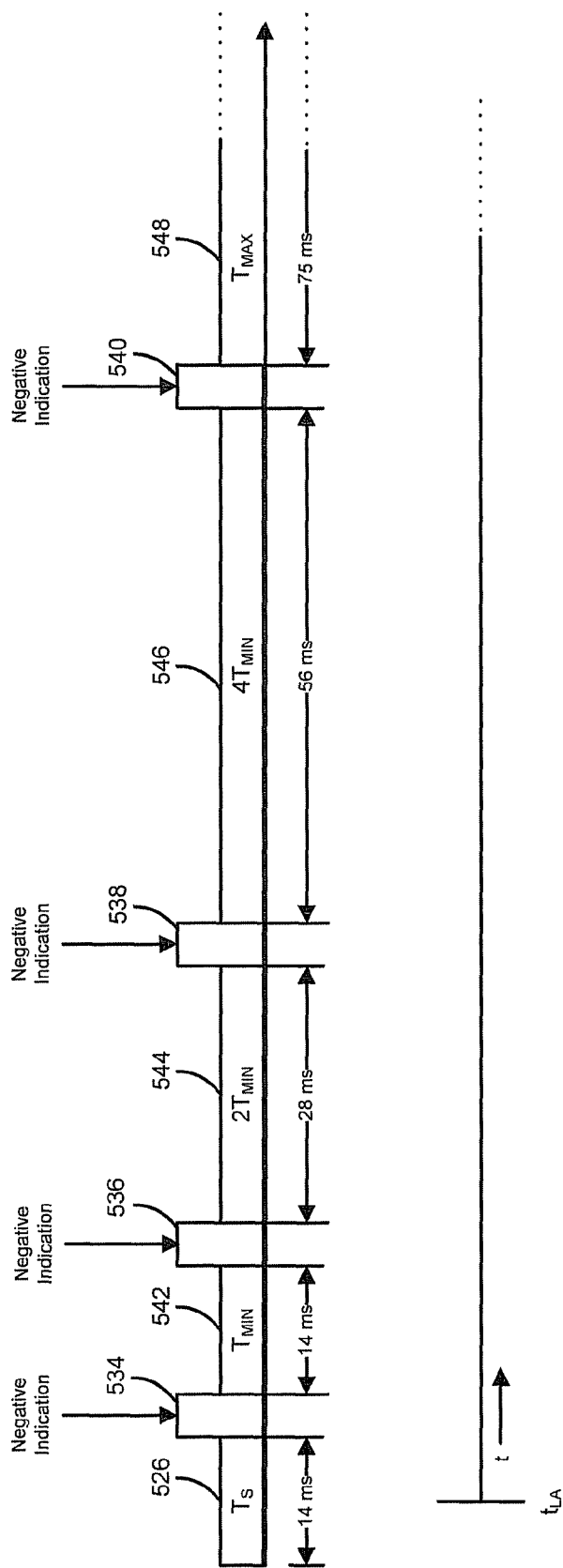
FIG. 5B is another simplified timeline illustrating the application of reactive power saving in voice-over-IP communications, according to an exemplary embodiment.

FIG. 5A is a simplified timeline illustrating the application of reactive power-saving in a VoIP session. Initially, the subscriber station may query the base station, or access a locally-maintained database, to determine whether or not VoIP communication sessions are classified as variable-activity communication sessions. The nature of VoIP communications is that packet bursts (e.g., such as when an incoming voice communication is being received at the subscriber station) may be followed by periods of inactivity (e.g., such as when there is a period of silence during a conversation, or possibly during transmission of an outgoing voice communication from the subscriber station). Therefore, a VoIP communication session may be classified as a variable-activity communication session. Accordingly, the subscriber station may determine that a reactive power-saving method should be used to conserve power during the VoIP session. In particular, previous to or at time $t_{HA}$, the subscriber station determines that the communication is in a high-activity state, and selects PSC II as its power-saving mode.

The subscriber station may use the packet inter-arrival rate and a maximum tolerable delay for VoIP as a basis for determining the sleep interval $T_S$ for use while operating under PSC II. As shown, the first four packets, Packet_A-Packet_D, arrive during the wake modes periods 502-508, respectively, and the packet inter-arrival times between these packets are all equal to 20 ms. Further, in this example, both the threshold period and the maximum tolerable delay for VoIP communications are set to 50 ms, the listening interval $T_L$ is 1 ms in duration, and each wake mode period 502-508 is 5 ms in duration. Thus, the subscriber station determines that:

$$T_S = \mathrm{MIN}(20\ \mathrm{ms} - (1\ \mathrm{ms} + 6\ \mathrm{ms}), 50\ \mathrm{ms}) = 14\ \mathrm{ms}$$

By setting $T_S$ to be equal to 14 ms, the subscriber station sleeps for 14 ms during sleep intervals 510-514, and wakes up to listen for a MOB-TRF-IND message for 1 ms during listening intervals 516-520. The sleep interval is selected such that the sum of a sleep interval, the listening interval and the wake mode period equals the packet inter-arrival time of 20 ms. The effect is that after receiving each packet, the subscriber station sleeps for a single sleeping interval $T_S$, receives a positive indication in a MOB-TRF-IND message during the first listening interval, and then wakes up to receive the next packet, and so on, as long as a steady stream of packets is arriving.

After receiving Packet_D during wake mode period 508, traffic in the VoIP session cease, at least temporarily. In practice, this may occur when a VoIP call is on hold, or when there is silence from all users participating in a VoIP session. Initially, after receiving Packet_D, the subscriber station will continue to operate under PSC II, until the packet inter-arrival time exceeds the threshold period for VoIP communications. In particular, after Packet_D arrives, the subscriber station initially alternates between sleep intervals 521-524 of 14 ms each, and listening intervals 528-532 of 1 ms each. As such, each cycle of a sleep interval and a listening interval lasts 15 ms. Then, at 5 ms into the fourth sleep interval 526 after Packet_D has arrived, the packet inter-arrival time has exceeded the threshold time of 50 ms (which in this case set to equal the maximum tolerable delay, although other thresholds are possible). Accordingly, at time $t_{LA}$ or shortly thereafter, the subscriber station determines that the VOIP session is in a low-activity state, and switches to PSC I.

FIG. 5A is a simplified timeline illustrating the application of reactive power-saving in a VoIP session, and in particular, the operation of the subscriber station after switching to PSC I at time $t_{LA}$. When (or shortly before) the subscriber station switches to PSC I, the subscriber station may calculate the minimum sleep interval $T_{MIN}$ and maximum sleep interval $T_{MAX}$ for use while operating under PSC I.

The subscriber station may use the current or most-recent packet inter-arrival time, the maximum tolerable delay for VoIP, the maximum tolerable jitter for VoIP and possibly other parameters or variables, to calculate the minimum sleep interval $T_{MIN}$ and the maximum sleep interval $T_{MAX}$ for PSC I. In the illustrated example, the packet inter-arrival time while operating under PSC II was determined to be 20 ms, the maximum tolerable delay for VoIP is 50 ms, and the maximum tolerable jitter for VoIP is 25 ms. Thus, the subscriber station determines $T_{MIN}$ as:

$$T_{MIN}=\text{MIN}(20 \text{ ms}-(1 \text{ ms}+6 \text{ ms}), 50 \text{ ms})=14 \text{ ms}$$

Further, the subscriber station may use the maximum tolerable delay for VoIP and the maximum tolerable jitter for VoIP to calculate the maximum sleep interval $T_{MAX}$ as:

$$T_{MAX}=50 \text{ ms}+25 \text{ ms}=75 \text{ ms}$$

As a result, the subscriber station will increase the PSC I sleep interval duration $S_n$ in successive sleep intervals, calculating $S_n$ to be equal to $14 \text{ ms}*(2^{(n-1)})$, until this calculation exceeds 75 ms. When $14 \text{ ms}*(2^{(n-1)})$ exceeds 75 ms, $S_n$ is held constant at 75 ms (i.e., $T_{MAX}$) until the subscriber station wakes up. In particular, as no packets are received, no positive indication is included in a MOB-TRF-IND during listening intervals 534-540. Therefore, the subscriber station increases the length of each successive sleep interval 542-548, from 14 ms in sleep interval 542, to 28 ms in sleep interval 544, to 56 ms in sleep interval 546. Then, in sleep interval 548, $14 \text{ ms}*(2^{(4-1)})$ is equal to 112 ms, which is greater than 75 ms. Therefore the duration of sleep interval 548 is set equal to 75 ms.

The subscriber station continues to use PSC I until it determines that the VoIP session is again in a high-activity state. This determination may be accomplished in various ways (not shown). For example, the when the subscriber station receives two packets with a packet inter-arrival time below the threshold period for VoIP communications, it may determine that the session is again in a high-activity state, and switch back to PSC II. Alternatively, the subscriber station may wait until it has received three or more packets with an average packet inter-arrival time that is below the threshold period, before determining that the session is in a high-activity state. As another alternative, the subscriber station may infer from a single packet arrival that data flow to the subscriber station is resuming, and responsively switch back to PSC II to receive subsequent packets.

Figure 6:
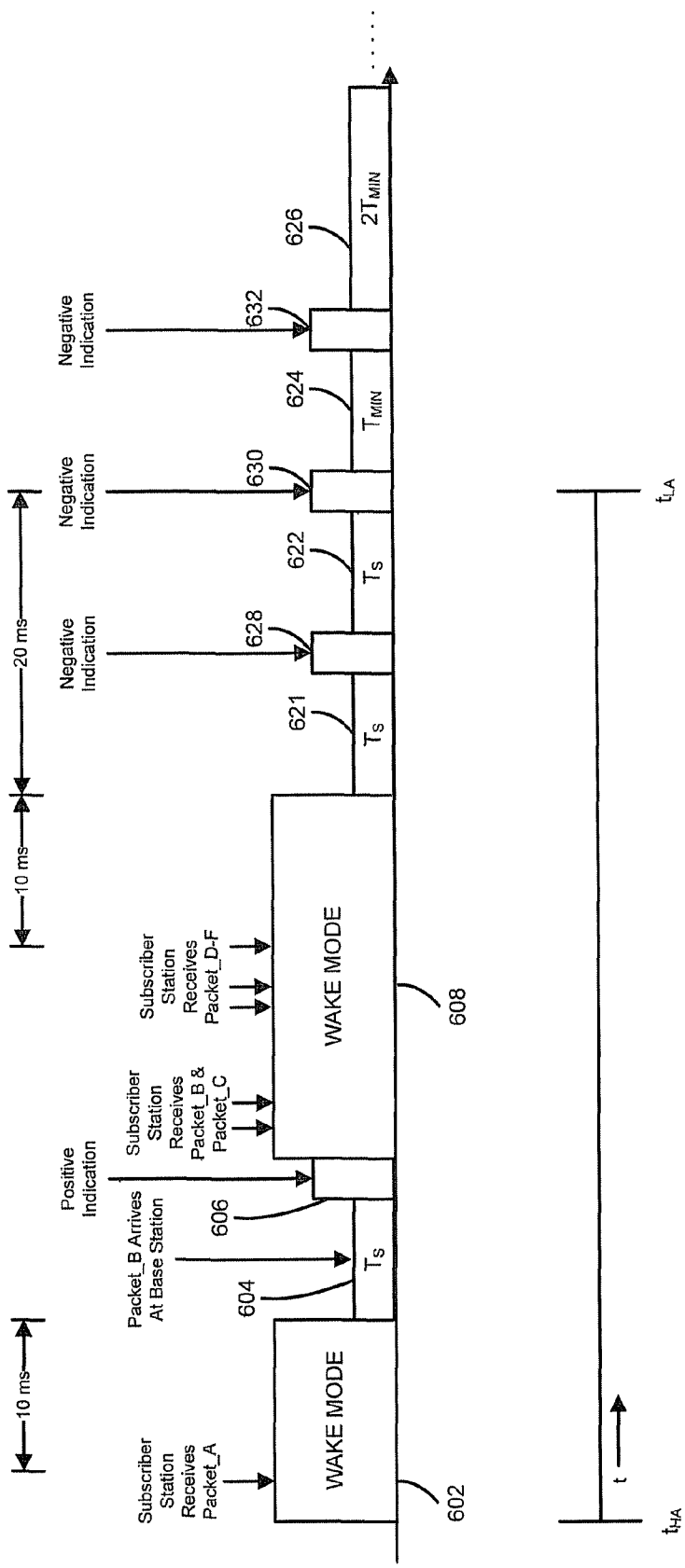
FIG. 6 is a simplified timeline illustrating the application of reactive power saving in a Internet communications, according to an exemplary embodiment.

FIG. 6A is a simplified timeline illustrating the application of hybrid power-saving in web session being conducted via the Internet. The nature of Internet communications are that packet bursts may be followed by periods of inactivity of varying length. Therefore, an Internet communication or web session may be classified as a variable-activity communication session.

In the illustrated example, previous to or at time $t_{HA}$, the subscriber station determines that the communication is in a high-activity state, and selects PSC II as its power-saving mode. For internet communications, the subscriber station may be configured to enter sleep mode in PSC II after 10 ms passes, and to switch to PSC I after a 40 ms threshold period of inactivity. Thus, when 10 ms passes after receiving Packet A during wake mode 602, the subscriber station switches to sleep mode under PSC II, ands sleeps for sleep interval 604. During sleep interval 604, Packet_B arrives at the serving base station, and thus the subscriber station receives a positive indication (i.e., a MOB-TRF-IND message) during listening interval 606, and wakes up to receive Packet_B during wake mode period 608. While awake, the subscriber station receives bursts of packets. In particular, the subscriber station receives Packet_A and Packet_B in quick succession. Then, before 10 ms passes, the subscriber station receives a second burst of packets, including Packet_D-Packet_F.

After receiving Packet_F during wake mode period 608, the web session reaches a stage where communications cease, at least temporarily. Thus, 10 ms after receiving Packet F, the subscriber station switches to sleep mode under PSC II. The subscriber station continues under PSC II until the packet inter-arrival time exceeds the threshold period for Internet communications, at which point the subscriber station switches to PSC I. More specifically, the subscriber station initially continues operating under PSC II, alternating between sleep intervals 621-622 and listening intervals 628-630. Then, at time $t_{LA}$, 20 ms after entering sleep mode (i.e., 30 ms after Packet F was received), the packet inter-arrival time exceeds the threshold period of 30 ms. Accordingly, at time $t_{LA}$ or shortly thereafter, the subscriber station determines that the VOIP session is in a low-activity state, and switches to PSC I. The subscriber station continues to use PSC I until it determines that the VoIP session is again in a high-activity state.

Exemplary embodiments of the present invention have been described above. It should be understood the word "exemplary" is used herein to mean "serving as an example, instance, or illustration." Any embodiment described herein as "exemplary" is not necessarily to be construed as preferred or advantageous over other embodiments. In addition, those skilled in the art will understand that changes and modifications may be made to these exemplary embodiments without departing from the true scope and spirit of the invention, which is defined by the claims.

We claim:

1. A method for power management in a subscriber station, wherein at least two predefined power-saving modes are defined for the subscriber station, the method comprising:

(a) during a communication session between a subscriber station and an access network, determining a packet inter-arrival time for data received from the access network;

(b) determining whether the packet inter-arrival time indicates that the communication session is in a high-activity state or, in the alternative, indicates that the communication session is in a low-activity state;

(c) if the packet inter-arrival time indicates that the communication session is in the low-activity state, then selecting a first power-saving mode for use by the subscriber station; and (d) if the packet inter-arrival time indicates that the communication session is in the high-activity state, then selecting a second power-saving mode for use by the subscriber station.

2. The method of claim 1, wherein determining the packet inter-arrival time comprises measuring a period of time between arrivals of two successive packets received from the access network.

3. The method of claim 1, wherein determining the packet inter-arrival time comprises tracking elapsed time since receiving a last-received packet from the access network.

4. The method of claim 3, wherein determining whether the packet inter-arrival time indicates that the communication session is in the high-activity state or, in the alternative, indicates that the communication session is in the low-activity state, comprises:
 determining whether or not the elapsed time since receiving the last-received packet exceeds a threshold amount of time;
 if the elapsed time does not exceed the threshold amount of time, then determining that the communication session is in the high-activity state; and
 if the elapsed time exceeds the threshold amount of time, then determining that the communication session is in the low-activity state.

5. The method of claim 1, further comprising:
 periodically repeating steps (a)-(b) in order to determine whether or not the communication session has switched from the high-activity state to the low-activity state or has switched from a low-activity state to a high-activity state; and
 performing step (c) or (d) according to the switch in state of the communication session.

6. The method of claim 1 carried out in response to an initial determination that the communication session is a variable-activity communication session.

7. The method of claim 1, wherein the access network is configured to provide service according to a WiMAX protocol, wherein the first power-saving mode is WiMAX power-saving class I (PSC I), and wherein the second power-saving mode is WiMAX power-saving class II (PSC II).

8. The method of claim 7, further comprising calculating a minimum sleep-interval parameter for PSC I.

9. The method of claim 8, wherein calculating the minimum-sleep-interval parameter for PSC I comprises calculating the minimum-sleep-interval to equal a minimum of (a) the determined packet inter-arrival time and (b) a delay tolerance for the communication session.

10. The method of claim 7, further comprising calculating a maximum-sleep-interval parameter for PSC I.

11. The method of claim 10, wherein calculating the maximum-sleep-interval parameter for PSC I comprises calculating the maximum-sleep-interval parameter to equal a sum of (a) a product of a delay tolerance for the communication session and a first constant $K_1$ and (b) a product of a jitter tolerance for the communication session and a second constant $K_2$.

12. The method of claim 7, further comprising calculating a sleep-interval parameter for PSC II.

13. The method of claim 12, wherein calculating the sleep-interval parameter to equal a minimum of (a) the determined packet inter-arrival time and (b) a delay tolerance for the communication session.

14. An apparatus configured to engage in communications via an access network, wherein the apparatus is further configured to be able to selectively operate in at least a first power-saving mode and a second power-saving mode, the apparatus comprising:
 a power source, wherein operating in the first or second power-saving mode reduces demand for power from the power source;
 a processor; and
 program code stored in data storage and executable by the processor to:
  (a) during a communication session via an access network, determine a packet inter-arrival time for data received from the access network;
  (b) determine whether the packet inter-arrival time indicates that the communication session is in a high-activity state or, in the alternative, indicates that the communication session is in a low-activity state;
  (c) if the packet inter-arrival time indicates that the communication session is in the low-activity state, then selectively operate in the first power-saving mode; and
  (d) if the packet inter-arrival time indicates that the communication session is in the high-activity state, then selectively operate in the second power-saving mode.

15. The apparatus of claim 14, wherein the apparatus is configured to engage in WiMAX communications via the access network, wherein the first power-saving mode is WiMAX power-saving class I (PSC I), and wherein the second power-saving mode is WiMAX power-saving class II (PSC II).

16. The apparatus of claim 14, further comprising program code stored in data storage and executable by the processor to use the determined packet inter-arrival time as a basis to calculate at least one of one or more parameters of the first power-saving mode and one or more parameters of the second power-saving mode.

17. The apparatus of claim 14 further comprising program code stored in data storage and executable by the processor to:
 make an initial determination as to whether or not the communication session is a variable-activity communication session; and
 condition the functionality of (a)-(d) on the initial determination being that the communication session is a variable-activity communication session.

18. A method for power management in a subscriber station, the method comprising:
 making a determination as to whether or not a communication session in which the subscriber station is engaged is a variable-activity communication session; and
 if the determination is that the communication session is a variable-activity communication session, then using a reactive power-saving method to conserve power during the communication session, wherein the reactive power-saving method comprises the subscriber station, during the communication session, selectively switching between two or more power-saving modes based on packet inter-arrival time of the communication session.

19. The method of claim 18, further comprising, if the determination is that the communication session is not a variable-activity communication session, then using a standard power-saving method or refraining from using a power-saving method during the communication session, wherein the standard power-saving method provides a single power saving mode for the subscriber station.

20. The method of claim 18, where making the determination as to whether or not the communication session in which the subscriber station is engaged is a variable-activity communication session comprises:
 determining that the communication session comprises a type of communication for which packet inter-arrival time is variable.

21. The method of claim 18, where making the determination as to whether or not the communication session in which the subscriber station is engaged is a variable-activity communication session comprises:
 determining that the communication session comprises a type of communication having a variable data rate.

22. The method of claim 18, wherein selectively switching between two or more power-saving modes based on packet inter-arrival time at the subscriber station comprises periodically:
- (a) determining a current packet inter-arrival time of the communication session; and
- (b) using the current packet inter-arrival time as a basis for selecting one of the two or more power-saving modes.

23. The method of claim 18, wherein selectively switching between two or more power-saving modes based on packet inter-arrival time at the subscriber station comprises periodically:
- (a) determining a current packet rate at which the subscriber station is receiving data from the access network; and
- (b) using the current packet rate as a basis for selecting one of the two or more power-saving modes for use by the subscriber station.

* * * * *